(12) United States Patent
Lavender

(10) Patent No.: US 9,653,719 B2
(45) Date of Patent: May 16, 2017

(54) BATTERY

(71) Applicant: PAG LTD., London (GB)

(72) Inventor: John Paul Lavender, London (GB)

(73) Assignee: PAG LTD., London (GB)

( * ) Notice: Subject to any disclaimer, the term of this patent is extended or adjusted under 35 U.S.C. 154(b) by 538 days.

(21) Appl. No.: 14/046,093

(22) Filed: Oct. 4, 2013

(65) Prior Publication Data

US 2015/0099151 A1   Apr. 9, 2015

(51) Int. Cl.
*H01M 2/20* (2006.01)
*H01M 2/10* (2006.01)

(52) U.S. Cl.
CPC ......... *H01M 2/204* (2013.01); *H01M 2/1022* (2013.01); *H01M 2/1077* (2013.01); *H01M 2/206* (2013.01)

(58) Field of Classification Search
None
See application file for complete search history.

(56) References Cited

U.S. PATENT DOCUMENTS

| | | |
|---|---|---|
| 1,536,322 A | 5/1925 | Benjamin |
| 1,646,807 A | 10/1927 | Benjamin |
| 2,542,404 A | 2/1951 | Ensign |
| 2,899,669 A | 2/1951 | Johanson |
| 3,335,330 A | 8/1967 | Hall et al. |
| 3,564,482 A | 2/1971 | Yamanaka et al. |
| 3,588,239 A | 6/1971 | Hochstein et al. |
| 3,617,985 A | 11/1971 | Kehl |
| 3,668,605 A | 6/1972 | Albert |
| 3,728,664 A | 4/1973 | Hurst |
| 3,740,696 A | 6/1973 | Schleicher et al. |
| 3,836,885 A | 9/1974 | Larsile |
| 3,967,303 A | 6/1976 | Fischer et al. |
| 3,969,796 A | 7/1976 | Hodsdon et al. |
| 3,984,169 A | 10/1976 | Armstrong et al. |
| 3,997,092 A | 12/1976 | Pogwizd |
| 4,050,003 A | 9/1977 | Owings et al. |
| 4,085,253 A | 4/1978 | Johnson |

(Continued)

FOREIGN PATENT DOCUMENTS

| | | |
|---|---|---|
| EP | 0003649 A1 | 8/1979 |
| EP | 0152650 A1 | 8/1985 |

(Continued)

OTHER PUBLICATIONS

Official Letter in co-pending, related GB Application No. 1115200.6, mailed Mar. 20, 2015.

(Continued)

*Primary Examiner* — Alix Eggerding
(74) *Attorney, Agent, or Firm* — Thomas | Horstemeyer, LLP

(57) ABSTRACT

A battery includes a first mechanical coupling unit and a second mechanical coupling unit. The first coupling unit includes a plurality of mechanical coupling pins (18). Each of the mechanical coupling pins (18) includes a pin head (22) and a pin shaft (20). The pin heads (22) have a greater diameter than the pin shafts (20). The second mechanical coupling unit includes a plurality of capture elements (24, 26) configured to capture heads of mechanical coupling pins of a first mechanical coupling unit.

20 Claims, 7 Drawing Sheets

(56) References Cited

U.S. PATENT DOCUMENTS

| | | |
|---|---|---|
| 4,218,107 A | 8/1980 | Wilson |
| 4,261,495 A | 4/1981 | Muller |
| 4,329,962 A | 5/1982 | Johnston |
| 4,340,267 A | 7/1982 | Nukaga |
| 4,420,207 A | 12/1983 | Nishikawa |
| 4,431,245 A | 2/1984 | Jigamian et al. |
| 4,452,383 A | 6/1984 | Marttinen |
| 4,518,217 A | 5/1985 | Corrigan, III |
| 4,545,414 A | 10/1985 | Baum |
| 4,550,968 A | 11/1985 | Corrigan |
| 4,554,221 A | 11/1985 | Schmid |
| 4,554,500 A | 11/1985 | Sokira |
| 4,554,621 A | 11/1985 | Corrigan |
| 4,586,766 A | 5/1986 | Hofmeister |
| 4,616,169 A | 10/1986 | Proffitt |
| 4,709,974 A | 12/1987 | Hawkins |
| 4,810,199 A | 3/1989 | Kar |
| 4,810,204 A * | 3/1989 | Wilson ............... H01M 2/1022 439/343 |
| 4,822,296 A | 4/1989 | Wilson |
| 4,836,799 A | 6/1989 | Tomer |
| 4,849,682 A | 7/1989 | Bauer et al. |
| 4,878,606 A | 11/1989 | Miller |
| 4,965,738 A | 10/1990 | Bauer et al. |
| 5,007,848 A | 4/1991 | Lee |
| 5,038,093 A | 8/1991 | Edwards et al. |
| 5,057,383 A | 10/1991 | Sokira |
| 5,089,834 A | 2/1992 | Nakasa et al. |
| 5,104,752 A | 4/1992 | Baughman et al. |
| 5,135,406 A | 8/1992 | Ishikawa |
| 5,195,666 A | 3/1993 | Yamaguchi et al. |
| 5,233,281 A | 8/1993 | Chiang et al. |
| 5,251,329 A | 10/1993 | Takagi et al. |
| 5,256,954 A | 10/1993 | Chen |
| 5,287,052 A | 2/1994 | Wang |
| 5,306,172 A | 4/1994 | Inada et al. |
| 5,350,993 A | 9/1994 | Toya et al. |
| 5,369,565 A | 11/1994 | Chen et al. |
| 5,403,093 A | 4/1995 | Flynn, Jr. et al. |
| 5,412,547 A | 5/1995 | Hornblad et al. |
| 5,496,657 A | 3/1996 | Dixon, Jr. |
| 5,592,064 A | 1/1997 | Morita |
| 5,602,454 A | 2/1997 | Arakawa et al. |
| 5,613,863 A | 3/1997 | Klaus et al. |
| 5,616,968 A | 4/1997 | Fujii |
| 5,652,496 A | 7/1997 | Pilarzyk et al. |
| 5,656,914 A | 8/1997 | Nagele et al. |
| 5,663,012 A | 9/1997 | Shannon et al. |
| 5,777,453 A | 7/1998 | Imanaga |
| 5,816,439 A * | 10/1998 | Lovell .................... B65D 25/32 220/760 |
| 5,821,732 A | 10/1998 | Chen |
| 5,844,401 A | 12/1998 | Lee |
| 5,917,152 A | 6/1999 | Kameyama |
| 5,921,797 A | 7/1999 | Bass et al. |
| 5,959,368 A | 9/1999 | Kubo et al. |
| 6,102,725 A | 8/2000 | Panagiotou |
| 6,109,938 A | 8/2000 | Meslet et al. |
| 6,233,141 B1 | 5/2001 | Lee et al. |
| 6,247,962 B1 | 6/2001 | DeSorbo |
| 6,285,158 B1 | 9/2001 | Higuchi |
| 6,346,793 B1 | 2/2002 | Shibata et al. |
| 6,384,575 B1 | 5/2002 | Chen et al. |
| 6,457,988 B1 | 10/2002 | Andersen |
| 6,489,744 B2 | 12/2002 | Lavender |
| 6,638,086 B2 | 10/2003 | Lavender et al. |
| 6,749,960 B2 | 6/2004 | Takeshita et al. |
| 6,783,403 B2 | 8/2004 | Lafragette et al. |
| 6,805,997 B1 | 10/2004 | Katayama |
| 6,935,883 B2 | 8/2005 | Oddsen, Jr. |
| 7,064,519 B2 | 6/2006 | Ito |
| 7,271,760 B2 | 9/2007 | Bartosik et al. |
| 7,347,714 B2 | 3/2008 | Liang |
| 7,390,211 B2 | 6/2008 | Moscovitch |
| 8,029,311 B2 | 10/2011 | Ohshima et al. |
| 8,299,656 B2 | 10/2012 | Allard et al. |
| 8,573,324 B2 | 11/2013 | Turner et al. |
| 2005/0226741 A1 | 10/2005 | Huang |
| 2007/0037456 A1 | 2/2007 | Burgess |
| 2008/0254670 A1 | 10/2008 | Balsells et al. |
| 2009/0146610 A1 | 6/2009 | Trigiani |
| 2010/0117591 A1* | 5/2010 | Thomas ............... H02J 7/0055 320/101 |
| 2011/0025258 A1 | 2/2011 | Kim et al. |
| 2012/0038322 A1 | 2/2012 | Moorhead et al. |
| 2013/0057076 A1 | 3/2013 | Lavender |
| 2013/0059477 A1 | 3/2013 | Lavender |

FOREIGN PATENT DOCUMENTS

| | | |
|---|---|---|
| EP | 0506439 A1 | 9/1992 |
| EP | 0559573 A1 | 8/1993 |
| EP | 2 164 127 A1 | 3/2010 |
| GB | 1532748 | 11/1978 |
| GB | 1571061 | 7/1980 |
| GB | 2083296 | 3/1982 |
| GB | 2223134 A | 3/1990 |
| GB | 2253513 A | 9/1992 |
| GB | 2260040 A | 3/1993 |
| GB | 2263362 A | 7/1993 |
| GB | 2270832 A | 3/1994 |
| GB | 2335027 A | 9/1999 |
| GB | 2425185 A | 10/2006 |
| JP | 08148233 A | 6/1996 |
| JP | 2009011138 A | 1/2009 |

OTHER PUBLICATIONS

"NZ's Pro Audio Show 2011", NZ Video News, vol. 172, Aug. 2011.

PAGlink website extract entitled "High Power Linking Batteries—A one-system Power Solution for Camera Types", Aug. 2011.

Search Report in a related GB Application No. 1115200.6, mailed Jan. 26, 2012.

Seach Report in related GB application No. 11152036.0, issued Oct. 25, 2011.

Extended European Search Report in co-pending, related EP Application No. 12275132.4, mailed Apr. 8, 2015.

* cited by examiner

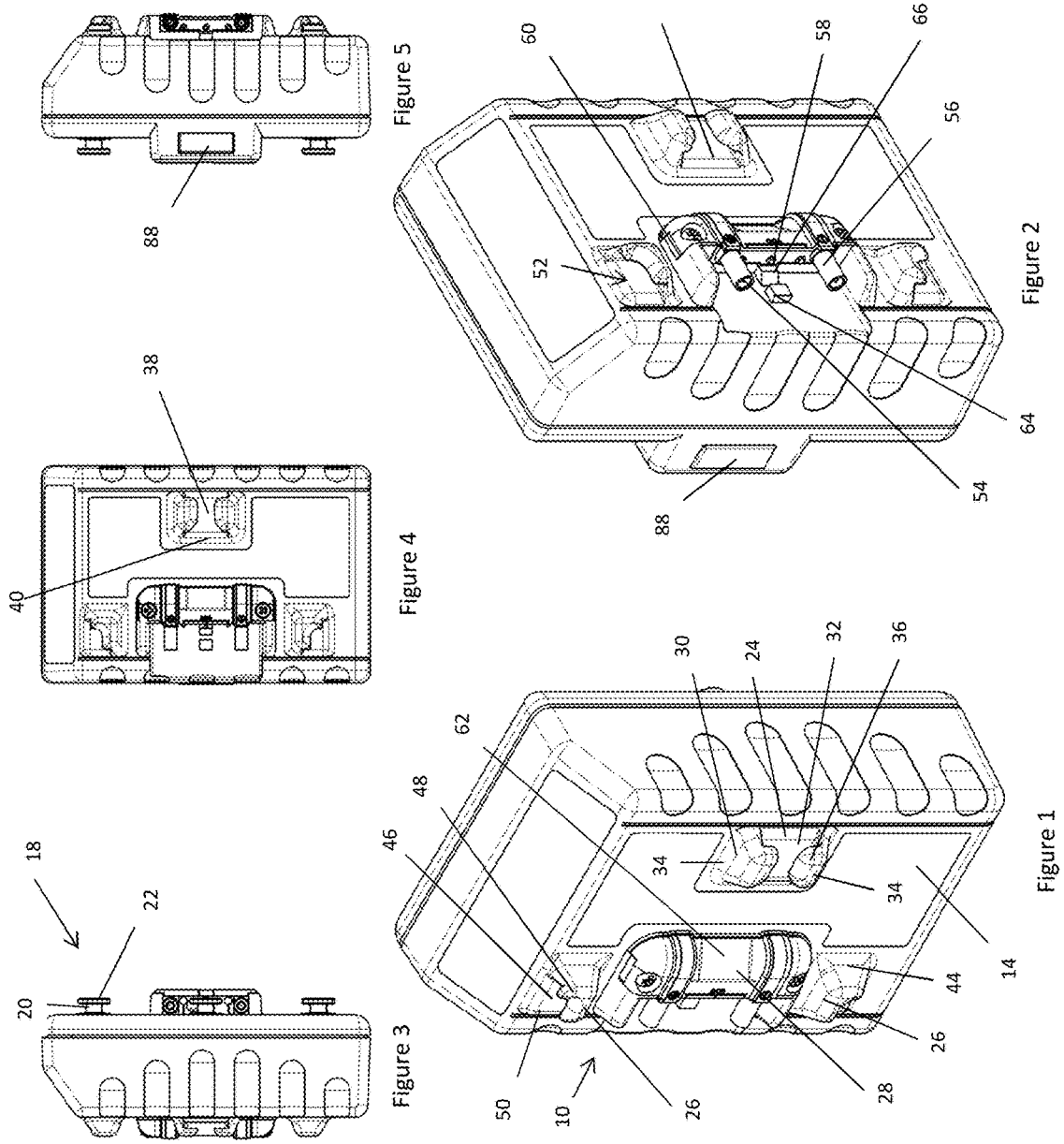

BATTERY

BACKGROUND OF THE INVENTION

The present invention relates to batteries, for example batteries for high power devices.

There is an established industry in providing batteries for powering electrical devices used for a multitude of applications, particularly batteries which are intended to be replaced during the use of the device. One such application is in the field of professional video cameras, where the video crew would typically travel with a plurality of batteries for powering the cameras for significant periods of time, particularly where main power supplies might not be available. There are many other similar applications, including also for powering electric vehicles and other large devices.

Batteries for cameras are known which include mechanical coupling arrangements that include pins, the pins including shafts and heads, and the head having a greater diameter than the shaft. The pins are configured for coupling into recesses provided in a coupling plate on a device, such as a camera. A release element is provided in a corner of the coupling plate in order to allow the pins to be removed from the recesses.

However, there is a growing need to provide high capacity batteries in order to power devices which are power hungry. Examples include high and very high definition cameras, vehicles and so on. However, high capacity batteries can be dangerous as a result of the current which they can potentially produce, particularly in the case of device malfunction or damage to the battery. As a result of this, airlines for instance limit the capacity of batteries which can be carried on board to no more than 100 Watt-hours (Wh). While this may be a reasonable capacity limit for travel safety purposes, batteries of such capacity are insufficient for powering some modern electronic devices, such as high powered cameras.

SUMMARY OF THE INVENTION

Aspects of the present invention seek to provide an improved battery.

According to an aspect of the invention, there is provided a battery including a first mechanical coupling unit and a second mechanical coupling unit, the first mechanical coupling unit including a plurality of mechanical coupling pins, each of the mechanical coupling pins including a pin head and a pin shaft, the pin head having a greater diameter than the pin shaft, and the second mechanical coupling unit including a plurality of capture elements configured to capture the pin heads of the mechanical coupling pins of the first mechanical coupling unit of a second such battery.

Preferred embodiments of the invention are able to allow multiple batteries to be coupled together in order to provide a battery stack which has an increased capacity and/or current carrying capability as compared with any of the individual batteries. This can mean that individual batteries can have a capacity of less than a predetermined safety limit (such as 100 Wh) in order to make them safe for travel purposes, but once they are needed they can be coupled together to provide a stack which has a capacity of more than the travel safety limit in order to power the device to which they are coupled for a significant period of time.

Preferably, the first mechanical coupling unit and the second mechanical coupling unit are located on opposite sides of the battery.

Preferably, each capture element includes a base, a ridge, and a slot at least partially between the base and the ridge; each slot being arranged to receive one of the pin heads of a second such battery with part of that pin head covered by the ridge and part of that pin head uncovered by the ridge.

Preferably, each slot is arranged to receive one of the pin heads of a second such battery with part of a circumference of that said pin head covered by the ridge and part of the circumference of that pin head uncovered by the ridge.

In preferred embodiments of the invention, abbreviation of mechanical connector features minimizes the material required to produce the second coupling unit, and improves the aesthetic appearance and ergonomic performance of the battery.

In embodiments, each capture element includes a base, a ridge, and a slot between the base and the ridge; wherein the ridges are proud of a first surface of the battery. Each base can be flush with or proud of the first surface of the battery.

Preferably, each base includes a path section leading from the first surface of the battery via an opening in the respective capture element into the slot of the respective capture element, wherein the opening has a width at least as great as a diameter of one of the pin heads, preferably a corresponding pin head, thereby allowing one of the pin heads, preferably the corresponding pin head, of the second such battery to be slid from the first surface of the battery into the slot of the respective capture element.

Preferably, each path section includes a guide section, such as a ramp, to guide one of the pin heads of a second such battery through the opening of the respective capture element.

In preferred embodiments of the invention, a battery can be coupled to a device or to another battery by a smooth movement in a single direction; the coupling units can be guided together without careful placement and manipulation by a user.

In embodiments of the invention, the battery includes a first electrical connector unit associated with the first mechanical coupling unit, and a second electrical connector unit associated with the second mechanical coupling unit, the second electrical connector unit being configured to cooperate with the first electrical connector unit of a second such battery to form an electrical connection therebetween upon cooperation of the second mechanical coupling unit with the first mechanical coupling unit of a second such battery.

Preferably, the first electrical connector unit includes a first locking element and the second electrical connector unit includes a second locking element; the second locking element being configured to mechanically cooperate with the first locking element of a second such battery to lock the battery to second such battery.

An advantage of the electrical connector units including locking elements is that the battery can be locked to another battery or to a device in the vicinity of the electrical contact. The efficiency of the electrical contact affects the possible current transferable as well as the risk of fires. Locking at the point of electrical contact can minimize the risk of a dangerous electrical coupling and maximize the possible current transfer.

In embodiments of the invention, the first mechanical coupling unit includes a first mechanical coupling pin located on a first part of the battery and a second mechanical coupling pin on a second part of the battery, wherein the first locking element is located closer to the first mechanical coupling pin than the second mechanical coupling pin is, and closer to the second mechanical coupling pin than the first mechanical coupling pin is. This can ensure that the first locking element is substantially central in at least one dimension of the battery, thereby reducing the possibility for the battery to pivot about the first locking element.

Preferably, one of the first and second locking elements includes a detent and the other includes a protrusion arranged so it can be held by the detent of a second such battery.

Embodiments of the invention include a release button for decoupling the first locking element from the second locking element of a second such battery or for decoupling the second locking element from the first locking element of a second such battery.

Preferably, the release button is coupled to the first locking element for decoupling the first locking element from the second locking element of a second such battery.

The release button is preferably configured to move the detent to release the protrusion of a second such battery.

In preferred embodiments of the invention, two coupled locking elements are locked together until a user presses the release button thereby to minimize the risk of unintended separation of the battery from the battery or device to which it is connected.

In embodiments, the first locking element includes a locking button arranged to be actuated by the protrusion of a second such battery, actuation of the locking button being configured to move the detent to a holding position in which it can hold the protrusion of a second such battery. The locking button can be a movable block as described below. The release button can also be configured to extend from a side of the battery in response to movement of the detent to the holding position. This can provide a visual display confirming secure coupling.

By having a locking button to move the detent into a holding position and a release button to move the detent into a releasing position, it is possible to ensure that deliberate action of the user is necessary in order to lock or unlock the battery from another battery or device.

In embodiments, the detent includes a detent channel, the detent channel including an open end for receiving the protrusion of a second such battery into the detent channel, a closed end opposite the open end, and a tab moveable between a holding position in which it closes the open end of the detent channel and a releasing position in which it opens the open end of the detent channel, the release button being configured to move the tab from the holding position to the releasing position. The movable tab can act as a latch.

Preferably, the release button includes a securing element movable between a secured position and a non-secured position, wherein in the secured position, the securing element inhibits movement of the tab from the holding position to the releasing position, and wherein in the non-secured position, the securing element allows movement of the tab; wherein the release button is configured to move the securing element into the non-secured position.

Preferably, the locking button is configured to move the securing element into the secured position.

In preferred embodiments, the securing element can prevent the first locking element from being overrun by sheer force. By providing a securing element as described herein, it is possible to ensure that it is only by the releasing button that the first locking element can be moved into the releasing position. This can prevent rough handling, or the sheer weight of batteries and devices, from dislodging the locking mechanism.

Preferably, one of the first and second electrical connector units is a male connector unit and the other of the first and second electrical connector units is a female connector unit; the male connector unit including electrical connector pins and the female connector unit including sockets configured for receiving the electrical connector pins of the male connector unit of a second such battery; the electrical connector pins of the male connector unit being shielded to inhibit or prevent unintentional contact, for example by a shroud around each of the electrical connector pins. This can prevent the electrical connector pins of the male connector unit from being accidentally short circuited, for example while the battery is being transported, which would otherwise have safety risks.

Preferably, the electrical connector pins or the sockets are moveable with respect to the first and/or second mechanical coupling units. This allows self-alignment to enable the electrical connector units to be connected despite possible errors in location arising from manufacturing tolerances.

Preferably, the second electrical connector unit includes a guard member, at least one side of the guard member being sloped to guide a mechanical coupling pins of the first mechanical coupling unit of a second such battery away from the battery thereby to aid separation of the battery from a second such battery.

Preferably, the first and/or second electrical connector elements are distinct components and are removable from the battery. Preferably, the first and/or second electrical connector units are provided as distinct components which are attached to the first and second surfaces of the battery by user-operable fasteners, such as screws. In this way, the user can replace any of these components him- or herself if they become damaged, rather than needing to replace the entire battery.

According to an aspect of the invention, there is provided an electrical connector element such as described herein which is releasably attachable to a battery.

In embodiments of the invention, the battery is controllable by a control unit which is able to control the operation of the battery to activate it or deactivate it in order to provide a required power draw. In the preferred embodiment, the battery includes the control unit, and the control unit is settable as a slave unit or a master control unit.

According to an aspect of the invention, there is provided a battery casing including a first mechanical coupling unit and a second mechanical coupling unit, the first mechanical coupling unit including a plurality of mechanical coupling pins, each of the mechanical coupling pins including a pin head and a pin shaft, the pin head having a greater diameter than the pin shaft, and the second mechanical coupling unit including a plurality of capture elements configured to capture the pin heads of the mechanical coupling pins of the first mechanical coupling unit of a second such battery.

In preferred embodiments of the invention:

The abbreviation of the mechanical features improves the aesthetic and ergonomic performance of the design.

The position and geometry of the latch provide an inherent 'anti-rotation' performance. Additionally, the latch incorporates a positive locking performance and a positive blocking action to prevent the latch being over-run by force. To release one battery from another, the release button is pressed, and the release button remains in after the separation. When batteries are fully latched together, the release button pops out and it can be seen at a glance that the batteries are secure. The latching feature is at the same time mechanically locked in position and cannot be over-run. Because the release button remains in after release, there is no confusion when a single battery is used in conjunction with a different female connector plate—there is no protruding release button on the battery. If the normal action of the latch mechanism is interfered with, so that the release button pops out, the latch system is fail-safe and will not allow the batteries to be connected together.

The design adds functionality to an existing connector block.

The centralized positioning of the release button aids the easy and safe removal of a battery from the stack. It is natural to hold the battery securely about the center with one hand while simultaneously pressing the release button.

A blocking feature and contact shroud tubes prevent a non-linking battery being connected onto a battery such as described herein. This is desirable for safety reasons since the non-linking battery will not incorporate a digital control system, which prevents unsafe currents from flowing between batteries which are in different states of charge, etc.

Self-aligning connector block assembly is provided.

The latch and connector block components are externally replaceable (no requirement to cut the battery open and replace the case halves if the latch or connector components are damaged).

BRIEF DESCRIPTION OF THE DRAWINGS

A preferred embodiment of the invention is described below, by way of example only, with reference to the accompanying drawings, in which:

FIG. 1 is a perspective view of a front of a battery according to an embodiment of the invention;

FIG. 2 is another perspective view of the front of the embodiment of FIG. 1;

FIG. 3 is a first side view of the embodiment of FIGS. 1 and 2;

FIG. 4 is a front view of the embodiment of FIGS. 1 to 3;

FIG. 5 is a second side view of the embodiment of FIGS. 1 to 4;

DETAILED DESCRIPTION

Figure 6:
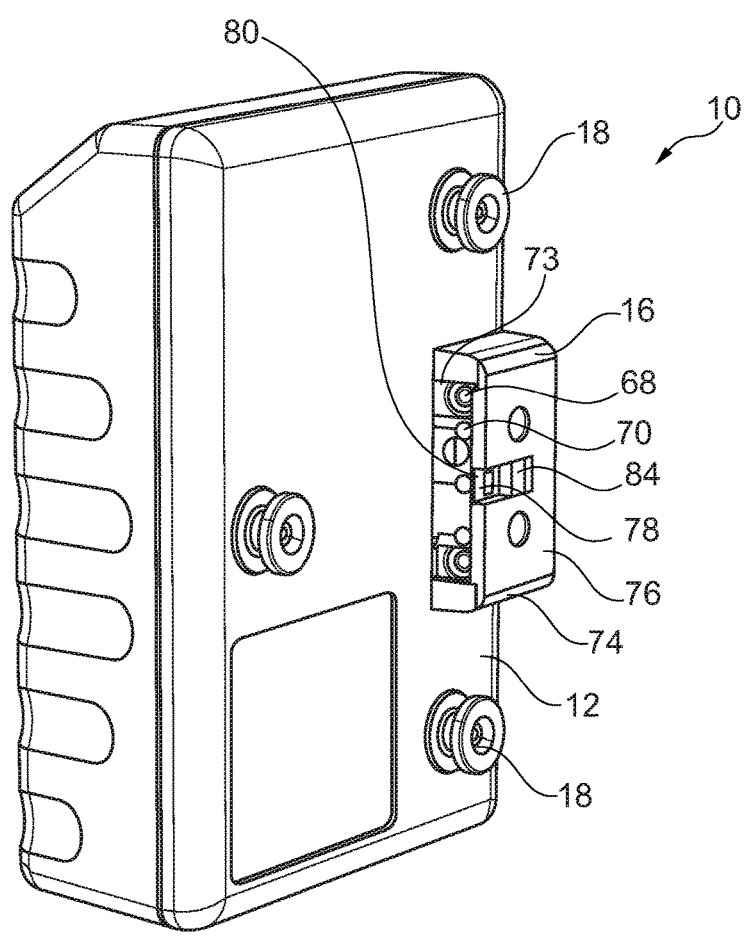
FIG. 6 is a perspective view of a rear of the embodiment of FIGS. 1 to 5.
Figure 7:
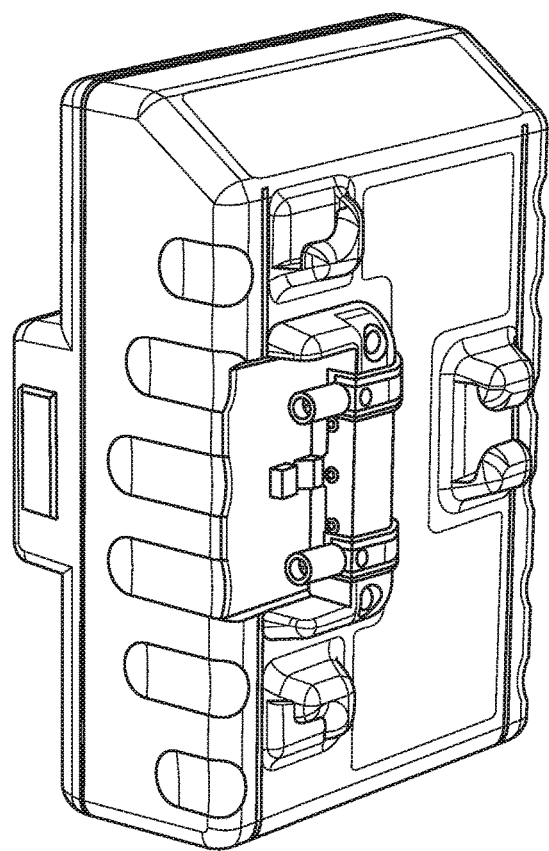
FIG. 7 is a perspective view of the front of the embodiment of FIGS. 1 to 6.

Although the description below uses terms such as 'front', 'rear', 'upper' and 'lower', it is to be appreciated that these terms are used for convenience of description and are based upon the orientation shown in the Figures, in which FIG. 4 is deemed to be a front view. However, the skilled person will appreciate that embodiments of the invention can be arranged in orientations other than those shown in the Figures, and surfaces other than that shown in FIG. 4 can be identified as a front.

In the description below, where a reference numeral is provided with a prime modifier ('), it is intended to denote that the indicated component corresponds to the component that has been described without the prime modifier, but that the indicated component may be located on a different battery or device. For example, where a battery is referred to as 10, then the numeral 10' refers to a different battery, but one which has the same features as described for battery 10.

The embodiment described below is a linking battery. By a linking battery, it is meant that the battery can be coupled together electrically and mechanically with other similar batteries to form a stack. As described above, this can mean that individual batteries can be provided with a capacity or current carrying capability below a safety limit but which can be coupled together for high power use.

With reference particularly to FIGS. 1 to 7, there is shown a battery 10 according to an embodiment of the invention. The battery includes a rear surface 12 and a front surface 14. Surfaces 12 and 14 are located on opposite sides of the battery 10.

On the rear surface 12 of the battery 10 is provided a first mechanical coupling unit, and a first electrical connector unit 16.

The first mechanical coupling unit includes a plurality of mechanical coupling pins 18. As shown clearly in the side views of FIGS. 3 and 5, each of the mechanical coupling pins 18 includes a shaft portion 20 and a head portion 22. The head portion 22 has a greater diameter than the shaft portion 20.

As shown most clearly in FIG. 6, in this embodiment there are provided three mechanical coupling pins 18 on the first surface 12 of the battery 10. However, in other embodiments, there can be more or fewer than three mechanical coupling pins 18.

The rear surface 12 can be considered to be divided into six zones. There are first and second upper zones, first and second middle zones and first and second lower zones. The term 'upper', 'middle' and 'lower' identifies the location of the zone along the length or height of the surface 12. 'Upper' means the zone is located in the uppermost region of the surface 12 as shown in the drawings, 'lower' means the zone is located in the lowermost region of the surface 12 as shown in the drawings, and 'middle' means the zone is located between the uppermost and lowermost regions. The first zones are, in FIG. 6, located in the left region of the surface, and the second zones are, in FIG. 6, located in the right region of the surface 12.

As can be seen from FIG. 6, first, second and third mechanical coupling pins 18 are provided. The first mechanical coupling pin 18 is provided in the second upper zone, the second mechanical coupling pin is provided in the first middle zone, and the third mechanical coupling pin is provided in the second lower zone. The first electrical connector unit is located in the second middle zone. The first electrical connector unit 16 is thereby located substantially between the first and third mechanical coupling pins 18. This has advantages for the security of coupling as described below. The first electrical connector unit 16 is described in more detail below.

In this embodiment, each of the mechanical coupling pins 18 is substantially identical. However, in other embodiments, the mechanical coupling pins can be of different dimensions or configurations, and/or can be provided in different locations.

On the front surface 14 of the battery 10 is provided a second mechanical coupling unit. The second mechanical coupling unit includes a plurality of capture elements 24, 26. There are an equal number of capture elements 24, 26 on the front surface 14 of the battery 10 as there are mechanical coupling pins 18 on the rear surface 12 of the battery 10. The capture elements 24 are arranged in an arrangement corresponding to the arrangement of the mechanical coupling pins on the rear surface so that the capture elements can capture mechanical coupling pins of a mechanical coupling unit corresponding to the first mechanical coupling unit, for example when a battery 10' similar to battery 10 is coupled to battery 10 in a linked stack.

In a similar way to the rear surface 12, the front surface 14 can be considered as being divided into six zones. On the front surface, the first zones are, in FIG. 4, located in the left region of the surface 12, and the second zones are, in FIG. 4, located in the right region of the surface. A first capture element is provided in the first upper zone, a second capture element is provided in the second middle zone, and a third capture element is provided in the first lower zone. A second electrical connector unit 28 is provided in the first middle zone.

The second mechanical coupling unit includes two types of capture element 24, 26. The second capture element 24 is of a first type and the first and third capture elements 26 are of a second type.

The first type of capture element includes a ridge 30 and a base 32. The base 32 and the ridge 30 are proud of the front surface 14. However, in other embodiments, the base 32 can be flush with the front surface 14.

The ridge 30 provides first and second side walls 34. The first side wall is provided on an upper side of the base 32 and the second side wall is provided on a lower side of the base 32. Each of the side walls 34 includes a roof section 36. A slot 38 is provided between the side walls 34. The slot 38 is bounded by the base 32, the side walls 34 and the roof sections 36. The slot 38 includes an opening 40 between ends of the side walls 34. The opening 40 faces the second electrical connector unit 28. The opening 40 and the slot 38 are dimensioned to receive a head of a mechanical coupling pin corresponding to the mechanical coupling pins provided in the first mechanical coupling unit. So that such a head can be slid into the slot 38, a gap is provided between the roof sections 36 of the first and second side walls 34 to allow a shaft of a mechanical coupling pin 18' to pass between the roof sections 36. The capture element is configured so that a pin head is held substantially parallel to the front surface 14 of the battery 10.

The base 32 includes a path section 42 leading from the front surface 14 of the battery into the slot 38 via the opening 40. The path section 42 includes a guide section to guide a pin head from the front surface into the opening 40 as it is slid towards the slot 38. An edge of the base 32 is configured to form a ramp that serves as the guide section.

The second type of capture element 26 includes a ridge 44 and base 46. The second type of capture element is similar to the first type of capture element except as described below.

Whereas in the first type of capture element 24 the side walls 34 are located on opposite sides of the slot 38, in the second type of capture element 26, the ridge 44 includes adjacent side walls. The side walls include roof sections 48 as per the first type of capture element 24. However, in the second type of capture element 26, there is no gap between the roof sections 48. The side walls and roof sections 48 form an L-shape. As in the first type of capture element 24, a slot 50 is provided in the second type of capture element 26, bounded by the base 46, side walls, and roof sections 48. The second type of capture element 26 includes an opening 52 into the slot 50. The opening 52 and the slot 50 are dimensioned to receive a head of a mechanical coupling pin corresponding to the mechanical coupling pins provided in the first mechanical coupling unit. So that such a head can be slid into the slot 50, the roof section 48 is configured not to obstruct a shaft of a mechanical coupling pin 18' of a similar battery or corresponding device when such a mechanical coupling pin is captured by the capture element. In addition, there is no roof section 48 provided over a path section along which the capture element is configured to receive such a mechanical coupling pin 18'. The capture element is configured so that a pin head is held substantially parallel to the front surface 14 of the battery 10.

The path section is configured in a corresponding manner to the path section 42 of the first type of capture element 24.

The openings 52 of the second type of capture element 26 are arranged to face away from the center of the front surface 14 of the battery 10.

Each of the openings 52, 40 is configured to allow a pin head to enter it along an entry direction. The entry directions of each of the openings 52, 40 are substantially parallel to each other to allow a first mechanical coupling unit to be slid into cooperation with the second mechanical coupling unit in a single smooth movement in which each of the mechanical coupling pins of the first mechanical coupling unit enter the openings of and thereby cooperate with their respective capture elements of the second mechanical coupling unit.

In the first capture element, a first side wall is located on a lower side of the base 46 and a second side wall is located on a right side of the base 46, wherein right is determined from the view of FIG. 4. In the third capture element, a first side wall is located on an upper side of the base 46 and a second side wall is located on a right side of the base 46, wherein right is determined from the view of FIG. 4.

The ridges of each of the capture elements are configured so that each capture element receives a pin head with part of the circumference of the pin head covered by the ridge (by a roof section of the ridge) and part of the circumference of the pin head uncovered by the ridge.

Each roof section 36, 48 is arranged with respect to the respective base so that a pin head held between that roof section and the respective base is restricted, preferably prevented, from moving in a direction perpendicular to the front surface 14 of the battery.

By providing capture elements in the form of ridges in the manner described above, capture elements can be provided which minimize the amount of material used as well as maximizing the use of space in the battery 10. It means that the front surface 14 of the battery 10 can be the edge of the cell-holding compartment, thereby ensuring the rigidity of the battery 10, and minimizing the space occupied by the battery, which is beneficial since a battery is a component in which space is at a premium.

The second electrical connector unit 28 is a male electrical connector unit and includes electrical connector pins 54. Each of the electrical connector pins 54 is protected by a shield 56 to inhibit or prevent unintentional contact with the respective electrical connector pin. This is important since electrical connector pins of a battery will typically be live, meaning that if unintentional contact were made with the electrical connector pins, the electrical connector pins could be shorted, resulting in a dangerous flow of current and a potential fire. In the embodiment depicted, the shield 56 takes form of a shroud, including a cylindrical wall coaxial with the respective electrical connector pin 54 but with an open end to allow the electrical connector pin 54 to connect to a corresponding female electrical terminal. Another advantage of the shields 56 is that they prevent a non-linking battery from being coupled to a battery according to the present embodiment. If a non-linking battery is coupled to a linking battery, there is a danger that the non-linking battery will provide a surge of uncontrolled current, which is not safe. The shields 56 prevent such coupling from occurring.

The second electrical connector unit may also include other electrical terminals 58 which are in the form of contact pads.

The electrical connector pins 54 and the terminals 58 are protected by a guard member 60. The guard member 60 is a wall which projects from the front surface 14 of the battery 10. The guard member 60 guards the electrical connector pins and terminals along the sides parallel to electrical connector pins 54 and along the side at which the electrical connector pins 54 couple into the battery 10. The guard member 60 also serves as a housing for the coupling of the electrical connector pins 54 and terminals 58 into the battery. However, the guard member 60 leaves free ends of the electrical connector pins 54 and the terminals 58 exposed for connection to a corresponding female electrical connector unit.

On the guard member 60, on the opposite side from the electrical connector pins 54, there is provided a sloped section 62 which slopes from a top of the guard member 60 (that is the part of the guard member 60 which is furthest from the front surface 14 of the battery) towards the front surface 14 of the battery 10. The sloping section 62 slopes along a line which passes through the opening 40 and into the slot 38 of the second capture element. In this way, as a mechanical coupling pin 18' is withdrawn from the second capture element towards the second electrical connector unit, the sloping section 62 serves to help slide the mechanical coupling pin 18' away from the front surface 14 of the battery 10 and thereby aid separation of the battery from the battery or device to which the mechanical coupling pin 18' is attached.

The side walls of the capture elements and the guard member 60 are arranged so that when a device or a battery with a mechanical coupling unit corresponding to the first mechanical coupling unit and an electrical connector unit corresponding to the first electrical connector unit 16 is coupled to the front surface 14 of the battery, substantially all relative movement between the coupled batteries or the coupled battery and device is prevented, except movement in a separating direction. The separating direction is governed by the direction of relative separation of the electrical connector units 28, 16'. In FIG. 4 the separating direction is by movement of the battery 10 to the right. As described below, movement in the separating direction can be selectively prevented by locking elements.

With reference to FIG. 4, movement of the battery 10 in an up direction is prevented by the first side wall of the first capture element and the second side wall of the second capture element being obstructed by mechanical coupling pins 18' in the capture elements, and by the lower wall of the guard member 60 being obstructed by the first electrical connector unit 16'. Movement of the battery 10 in a down direction is prevented by the first side walls of the second and third capture elements being obstructed by mechanical coupling pins 18' in the capture elements, and by the upper wall of the guard member 60 being obstructed by the first electrical connector unit 16'. Movement of the battery 10 in a left direction is prevented by the second walls of the first and third capture elements being obstructed by mechanical coupling pins 18' in the capture elements, and by the guard member 60 being obstructed by the first electrical connector unit 16'.

In this way, a substantially rigid coupling is obtained. However, in other embodiments, other arrangements of the side walls of the capture elements can be provided that, optionally in combination with the guard member 60, can prevent relative movement of the battery, and a device or battery to which it is coupled, except in a separating direction.

The first electrical connector unit 16 includes a first locking element, and the second electrical connector unit 28 includes a second locking element. The second locking element includes a protrusion 64. A stop 66 is also provided in the second electrical connector unit 28. The protrusion 64 and the stop 66 are arranged in a line parallel to and between the electrical connector pins 54. The stop 66 is configured to prevent advancement into the second electrical connector unit of a first electrical connector unit 16' beyond a certain point as described below. The protrusion 64 is configured to cooperate with a first locking element as described below. In addition, it also serves to prevent a non-linking battery from being coupled to a battery according to the preferred embodiment. Non-linking batteries generally have a side wall which would impact against the protrusion 64 as coupling is attempted. For the reasons described above, coupling of a non-linking battery to a linking battery should be avoided.

The first electrical connector unit 16 is a female electrical connector unit and includes a pin receiving section 73 within a housing 74. The pin receiving section 73 is movable with respect to and within the housing 74. This provides self-aligning properties as described below.

The pin receiving section 73 includes female electrical connector sockets 68 which are configured to receive electrical connector pins 54' corresponding to the electrical connector pins 54 of the second electrical connector unit 28. In addition, the first electrical connector unit 16 includes terminals 70 configured to electrically couple to terminals 58' of a male electrical connector unit 28'. The pin receiving section 73 is configured to be movable with respect to the housing 74 in a direction substantially perpendicular to the connector sockets 68. This means that as electrical connector pins 54' are pushed towards the connector sockets 68, the pin receiving section will move with respect to the housing to allow the electrical connector pins 54' to enter the connector sockets 68. This provides advantageous self-alignment which allows for manufacturing tolerances in the relative locations of the electrical connector pins 18 with respect to the first electrical connector unit 16 and the capture elements 24, 26 with respect to the second electrical connector unit 28. It can also allow for slight distortion of the electrical connector pins 54'.

Voids are provided around the connector sockets 68 to prevent shields 56' from obstructing connection of the connector sockets 68 to electrical connector pins 54'. The shields 56' can slide into the voids as the electrical connector pins 54' are slid into the connector sockets 68.

The housing 74 also houses the electrics of the first electrical connector unit 16 and houses the first locking element. In a cover plate 76 of the housing 74 is provided a detent channel 78. The detent channel 78 is open at one end 80 to allow a protrusion 64' to be slid into the detent channel. In this way, the cooperation of the detent channel 78 and the protrusion can also serve to provide a self-aligning function which ensures other components of the coupling and connector units are in line for connection.

Figure 9:
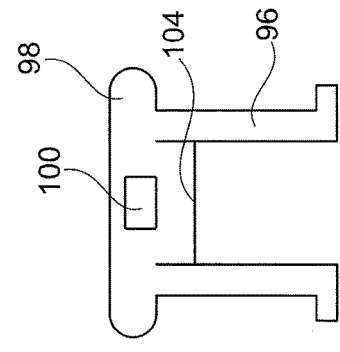
FIG. 9 is a plan view of a pivoting member of the locking element of FIG. 8.
Figure 10:
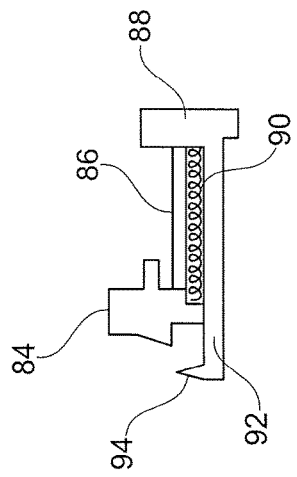
FIG. 10 is a side view of a part of the locking element of FIGS. 8 and 9.
Figure 8:
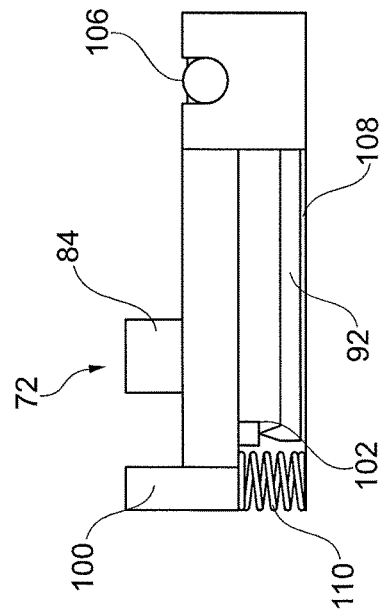
FIG. 8 is a side view of a locking element of the embodiment of FIGS. 1 to 7.
Figure 11:
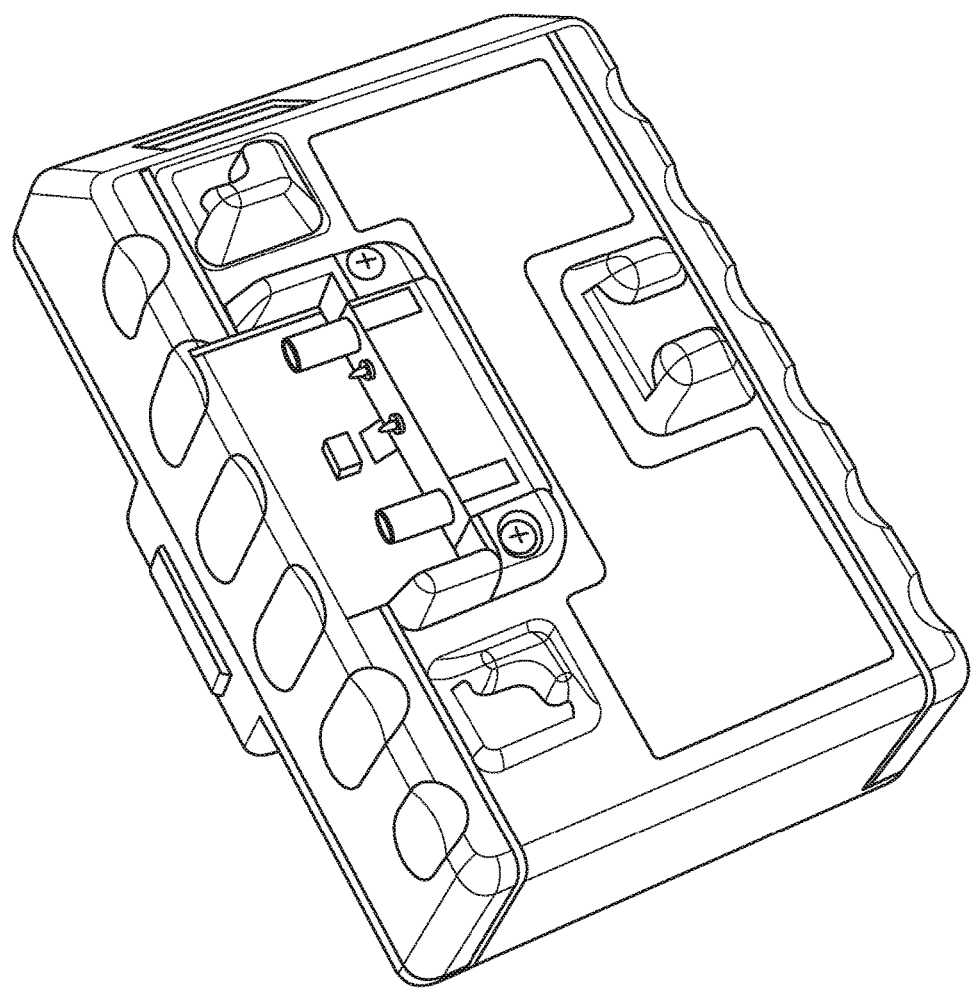
FIG. 11 is a front perspective view of an embodiment of the invention.
Figure 12:
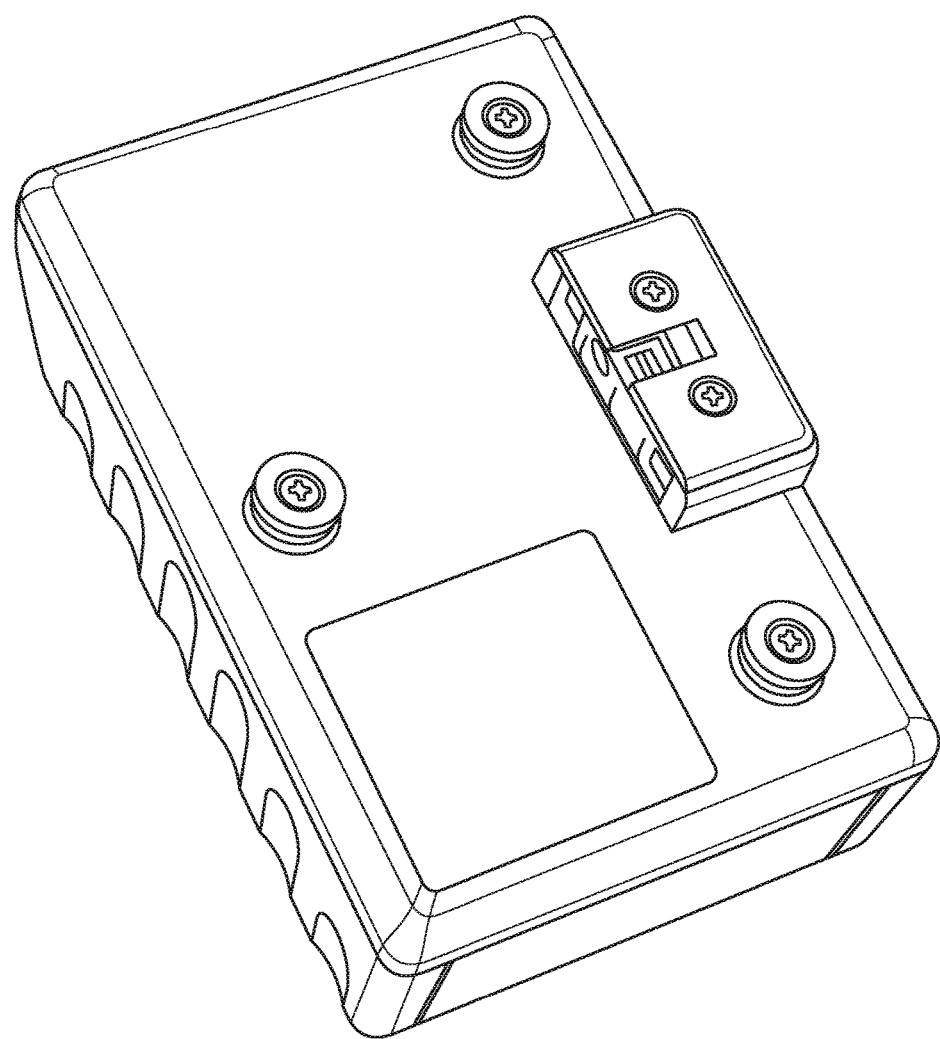
FIG. 12 is a rear perspective view of the embodiment of FIG. 11.
Figure 13:
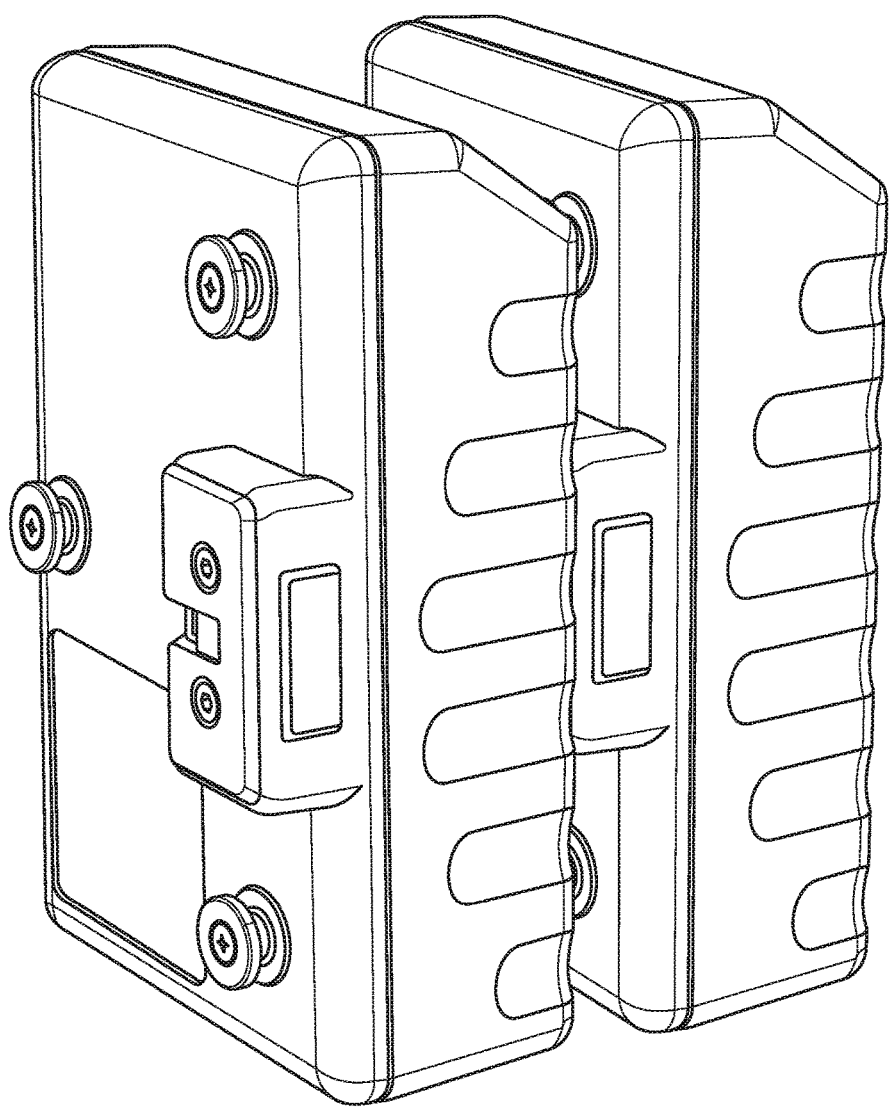
FIG. 13 is a perspective view of the embodiment of FIGS. 11 and 12 in which the battery is shown coupled to another similar battery.

The first locking element is described further with particular reference to FIGS. 8 to 10. FIG. 8 shows a side view of components of the first locking element with other components of and within the housing 74 removed.

The first locking element includes a detent 72 which is configured so that when a second electrical connector unit 28' is coupled to the first electrical connector unit 16, the protrusion 64' of the second electrical connector unit is held by the detent 72. The detent 72 is provided by a block 84, the detent channel 78 and a movable tab 100 as is described below.

The block 84 protrudes into and is movable along the detent channel 78. A side view of the block 84 and its means of movement, but without showing other components of the first locking element is shown in FIG. 10.

The block 84 is slidable along a bar 86. The bar 86 is coupled to a release button 88. The block is biased along the bar 86 away from the release button 88 by biasing member 90, such as a coiled spring.

Also coupled to the release button 88 is a securing element 92 which extends from the release button 88 substantially parallel to the bar 86 and terminates in a securing projection 94.

As shown in FIGS. 8 and 9, extending alongside the bar 86 on either side are first and second arms of a pivoting member 96. The first and second arms of the pivoting member 96 are joined together by an end section 98 which includes the tab 100. On the side of the end section 98 opposite the tab 100 is a catch 102. The end section 98 of the pivoting member includes a sloping section 104 facing the release button 88. The sloping section 104 slopes away from the tab towards a base 108 of the first locking element, typically a base of the housing 74, so that impact of the block 84 on the sloping section 104 will cause the pivoting member to pivot towards the base 108, as described below.

The pivoting member 96 is pivoted about a pivot 106. The pivoting member 96 is biased to pivot away from the base 108 by a biasing member 110 for example a coiled spring.

The first locking element is configured to be movable between a holding position and a releasing position. In the holding position, the tab 100 is pivoted into the detent channel 78 by the pivoting member 96 under the force of the biasing member 110. The securing element 92 is configured so that in the holding position the projection 94 is located to obstruct movement towards the base 108 of the catch 102. The force of the biasing member 90 causes the release button 88 to project beyond a side of the battery in the holding position.

Accordingly, in the holding position, the detent 72 is provided by the detent channel being closed at one end by the block 84, and closed at the other end by the tab 100. The detent 72 is configured to be able to hold a protrusion 64'. The location of the projection 94 in the holding position means that movement of the tab 100 against the biasing force of the biasing member 110 is obstructed by the projection 94 to prevent the locking element from being pushed into the releasing position.

As explained above, in the holding position the release button extends beyond the side of the battery 10 owing to the force of the biasing member 90 against the release button 88.

In the releasing position, the release button 88 is substantially flush with the side of the battery 10, and held in this position by abutment of the projection 94 with the side of catch 102 which is distal from the release button 88. In this position, the biasing force of the biasing member 90 pushes the block 84 against the sloping section 104 to push the pivoting member 96 against the biasing force of the biasing member 110, causing the tab 100 to move towards the base 108, thereby allowing a projection 64' to be slid into or out of the detent channel 78 past the tab 100.

The first and second mechanical coupling units described above, together with their associated first and second electrical connector units, can be used to couple and electrically connect a plurality of batteries together in a stack and/or to connect a battery to a device, such as a charger or a camera. Where a battery is to be connected to a device, the device can be provided with a second mechanical coupling unit together with its associated second electrical connector unit.

As described above, being able to couple a plurality of batteries together in a stack means that individual batteries can be provided with a current carrying capability or capacity below a predetermined threshold, such as a threshold applied by airlines to comply with travel safety requirements, but can be coupled together at a location at which they need to be used in order to increase the current carrying capability or capacity in order to serve high powered electronic equipment, such as video cameras.

As mentioned above, it can be dangerous to couple a non-linking battery to a linking battery because a non-linking battery is potentially going to provide a surge of uncontrolled current as its terminals are effectively electrically short circuited. Accordingly, in the preferred embodiment of the invention, the battery is controllable by a control unit which is able to control the operation of the battery to activate it or deactivate it in order to provide a required power draw. In the preferred embodiment, the battery includes the control unit, and the control unit is settable as a slave unit or a master control unit. Details of a suitable battery management system which can be used in embodiments of the invention is described in UK patent application publication GB 2494187 A, the disclosure of which is incorporated herein in its entirety by reference.

A battery 10 can be coupled to a second battery 10' in the following way. The battery is placed with its mechanical coupling pins 18 adjacent to the openings 40', 52' of the capture elements of the second battery. In this position, the first electrical connector unit 16 is adjacent to the second connector unit 28' of the second battery.

The first battery 10 is then slid with respect of the second battery 10' such that the heads 22 of the mechanical coupling pins 18 of the first battery are slid into the slots 38', 50' of the second battery. The mechanical coupling pins 18 of the first battery are guided by the guide members of the second battery into the slots 38', 50' of the capture elements of the second battery. As described above, the capture elements and guard member 60' of the second battery substantially prevent relative movement between the batteries except in a separating direction.

As the batteries are slid together, the pin receiving section 73 moves as necessary with respect to the housing 74 to allow the electrical connector pins 54' to enter the connector sockets 68. The protrusion 64' on the second battery 10' passes over the tab 100 of the first locking element of the first battery, which is in the releasing position, and pushes against block 84. This moves the block 84 off the sloping section 104 of the pivoting member 96, meaning that the biasing member 110 pushes the pivoting member 96 into its position for the holding position and thereby moves the tab 100 to close the open end of the detent channel 78 thereby holding the protrusion 64' between the block 84 and the tab 100. The stop 66' abuts the tab 100 to prevent further movement together of the electrical connector units. The bias of the biasing member 90 also causes the release button 88 to move out from the side of the battery 10 since the securing member 92 is no longer held by the catch 102. The first locking element is thereby in the holding position. The projection of the release button 88 from the side of the battery serves as a visual indicator to the user that successful coupling has been achieved.

As the skilled person will appreciate, in the absence of the projection 94 being caught by the catch 102, the biasing members 90 and 110 are biased to move the first locking element into the releasing position. Accordingly, if the first locking element is not working correctly, as soon as the user releases a force from the block 84, the first locking element (and thereby the release button 88) will move to the releasing position, thereby making it clear that the locking action has not been successfully achieved, thereby providing a failsafe system.

In the holding position of the first locking element, the second battery 10' is secured against the first battery 10 since movement parallel to the front surface 14' of the second battery is further constrained by the sides of the detent channel, the block 84, and the tab 100 of the first locking element of the first battery and movement in a separating direction is prevented by the detent 72.

Furthermore, because the locking elements are provided in the vicinity of the electrical connector units, the batteries are held most securely at the point of electrical contact, thereby ensuring a good contact. In addition, because the locking elements are substantially central in a length dimension, pivoting of one battery with respect to the other is minimized.

In order to release the batteries from each other, a user presses against the release button 88, pushing it in towards the battery. This causes the projection 94 of the securing member 92 to pass beyond the catch 102, thereby giving the catch 102 freedom to move towards the base 108. In addition, the biasing member 90 provides a force against the block 84, pushing the block 84 onto the sloping section 104. This causes the pivoting member 96 to pivot against the force of the biasing member 110 and to move towards the base 108 until the projection 94 is caught and prevented from moving the release button back out to the secured position owing to obstruction from the catch 102. The first locking element is thereby in the releasing position.

Having moved towards the base 108, the tab 100 no longer blocks the end of the detent channel, and the protrusion 64' of the second battery can be slid out of the detent channel. At the same time the mechanical coupling pins 18 can be slid out of the capture elements. The second mechanical coupling pin 18 may impact against the guard member 60' of the second battery 10' as it is slid out, and be guided away from the second battery 10' by the sloping section 62'.

A particular advantage of the releasing operation is that, as described above, the release button 88 is associated with the coupling unit that contains the mechanical coupling pins 18. This means that the user can conveniently grasp the battery that he or she intends to slide with one hand while actuating the release button 88 with the same hand in order to disengage the locking elements. This is easier than where the release button is provided on a coupling unit that includes capture elements since in that case the user would need to use one hand to press the release button while using the other hand to slide the mechanical coupling pins of the battery out of the capture elements.

Because the first locking element is moved into the releasing position by abutment of a projection 64' against the block 84, where the first electrical connector unit is coupled to an electrical connector unit of a device which has a different locking element, the first locking element is not moved into the releasing position, thereby keeping the release button substantially flush with the side of the battery, and avoiding confusion on the part of the user as to how to release the battery from the device.

Because the mechanical coupling pins 18 and the first and second electrical connector units 16, 28 are provided proud of the front and rear surfaces of the battery, they can be provided as distinct components which are attached to the front and rear surfaces of the battery by user-operable fasteners, such as screws. In this way, the user can replace any of these components him- or herself if they become damaged, rather than needing to replace the entire battery.

In addition, because the movable components of the locking elements are provided in the first locking element which is associated with the mechanical coupling pins 18, devices can be provided without movable components in the coupling and connector units. This can reduce wear on the device since all the movable components of the coupling and connector units can be provided on the battery.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The invention claimed is:

1. A battery including a first mechanical coupling unit and a second mechanical coupling unit, the first mechanical coupling unit including a plurality of mechanical coupling pins, each of the mechanical coupling pins including a pin head and a pin shaft, the pin head having a greater diameter than the pin shaft, and the second mechanical coupling unit including a plurality of capture elements configured to capture the pin heads of the mechanical coupling pins of the first mechanical coupling unit of a second such battery; the battery including a first electrical connector unit associated with the first mechanical coupling unit, and a second electrical connector unit associated with the second mechanical coupling unit, the second electrical connector unit being configured to cooperate with the first electrical connector unit of a second such battery to form an electrical connection therebetween upon cooperation of the second mechanical coupling unit with the first mechanical coupling unit of a second such battery; the first electrical connector unit including a first locking element and the second electrical connector unit including a second locking element; and the second locking element being configured to mechanically cooperate with the first locking element of a second such battery to lock the battery to a second such battery.

2. The battery according to claim 1, wherein the first mechanical coupling unit and the second mechanical coupling unit are located on opposite sides of the battery.

3. The battery according to claim 1, wherein each one of the capture elements includes a base, a ridge, and a slot at least partially between the base and the ridge; and each slot is arranged to receive one of the pin heads of a second such battery with part of that pin head covered by the ridge and part of that pin head uncovered by the ridge.

4. The battery according to claim 3, wherein each slot is arranged to receive one of the pin heads of a second such battery with part of a circumference of that pin head covered by the ridge and part of the circumference of that pin head uncovered by the ridge.

5. The battery according to claim 1, wherein each one of the capture elements includes a base, a ridge, and a slot between the base and the ridge; and wherein the ridges are proud of a first surface of the battery.

6. The battery according to claim 5, wherein each base is flush with or proud of the first surface of the battery.

7. The battery according to claim 6, wherein each base includes a path section leading from the first surface of the battery via an opening in the respective capture element into the slot of the respective capture element, wherein the opening has a width at least as great as a diameter of one of the pin heads, thereby allowing that pin head to be slid from the first surface of the battery into the slot of the respective capture element.

8. The battery according to claim 7, wherein each path section includes a guide section to guide one of the pin heads of a second such battery through the opening of the respective capture element.

9. The battery according to claim 1, wherein the first mechanical coupling unit includes a first mechanical coupling pin located on a first part of the battery and a second mechanical coupling pin on a second part of the battery, wherein the first locking element is located closer to the first mechanical coupling pin than the second mechanical coupling pin is, and closer to the second mechanical coupling pin than the first mechanical coupling pin is.

10. The battery according to claim 1, wherein one of the first and second locking elements includes a detent and the other includes a protrusion arranged so it can be held by the detent of a second such battery.

11. The battery according to claim 10, including a release button for decoupling the first locking element from the second locking element of a second such battery or for decoupling the second locking element from the first locking element of a second such battery.

12. The battery according to claim 11, wherein the release button is configured to move the detent to release the protrusion of a second such battery.

13. The battery according to claim 12, wherein the detent includes a detent channel, the detent channel including an open end for receiving the protrusion of a second such battery into the detent channel, a closed end opposite the open end, and a tab moveable between a holding position in which it closes the open end of the detent channel and a releasing position in which it opens the open end of the detent channel, the release button being configured to move the tab from the holding position to the releasing position.

14. The battery according to claim 13, wherein the release button includes a securing element movable between a secured position and a non-secured position, wherein in the secured position, the securing element inhibits movement of the tab from the holding position to the releasing position, and wherein in the non-secured position, the securing element allows movement of the tab; and wherein the release button is configured to move the securing element into the non-secured position.

15. The battery according to claim 11, wherein the first locking element includes a locking button arranged to be actuated by the protrusion of a second such battery, actuation of the locking button being configured to move the detent to a holding position in which it can hold the protrusion of a second such battery.

16. The battery according to claim 1, wherein the second electrical connector unit includes a guard member, at least one side of the guard member being sloped to guide a mechanical coupling pin of the first mechanical coupling unit of a second such battery away from the battery thereby to aid separation of the battery from a second such battery.

17. The battery according to claim 1, wherein the first and/or second electrical connector units are distinct components and are removable from the battery.

18. A battery including a first mechanical coupling unit and a second mechanical coupling unit, the first mechanical coupling unit including a plurality of mechanical coupling pins, each of the mechanical coupling pins including a pin head and a pin shaft, the pin head having a greater diameter than the pin shaft, and the second mechanical coupling unit including a plurality of capture elements configured to capture the pin heads of the mechanical coupling pins of the first mechanical coupling unit of a second such battery; the battery including a first electrical connector unit associated with the first mechanical coupling unit, and a second electrical connector unit associated with the second mechanical coupling unit, the second electrical connector unit being configured to cooperate with the first electrical connector unit of a second such battery to form an electrical connection therebetween upon cooperation of the second mechanical coupling unit with the first mechanical coupling unit of a second such battery; one of the first and second electrical connector units being a male connector unit and the other of the first and second electrical connector units being a female connector unit; the male connector unit including electrical connector pins and the female connector unit including sockets configured for receiving the electrical connector pins of the male connector unit of a second such battery; and the electrical connector pins of the male connector unit being shielded to inhibit or prevent unintentional contact by a shroud around each of the electrical connector pins.

19. A battery including a first mechanical coupling unit and a second mechanical coupling unit, the first mechanical coupling unit and the second mechanical coupling unit being located on opposite sides of the battery, the first coupling unit including a plurality of mechanical coupling pins, each of the mechanical coupling pins including a pin head and a pin shaft, the pin head having a greater diameter than the pin shaft, and the second mechanical coupling unit including a plurality of capture elements configured to capture the pin heads of the mechanical coupling pins of the first mechanical coupling unit of a second such battery, wherein each capture element includes a base, a ridge, and a slot at least partially between the base and the ridge; each ridge being proud of a first surface of the battery, and each slot being arranged to receive one of the pin heads of a second such battery with part of that pin head covered by the ridge and part of that pin head uncovered by the ridge; the battery including a first electrical connector unit associated with the first mechanical coupling unit, and a second electrical connector unit associated with the second mechanical coupling unit, the second electrical connector unit being configured to cooperate with the first electrical connector unit of a second such battery to form an electrical connection therebetween upon cooperation of the second mechanical coupling unit with the first mechanical coupling unit of a second such battery; the first electrical connector unit including a first locking element and the second electrical connector unit including a second locking element; and the second locking element being configured to mechanically cooperate with the first locking element of a second such battery to lock the battery to a second such battery.

20. A battery casing including a first mechanical coupling unit and a second mechanical coupling unit, the first coupling unit including a plurality of mechanical coupling pins, each of the mechanical coupling pins including a pin head and a pin shaft, the pin head having a greater diameter than the pin shaft, and the second mechanical coupling unit including a plurality of capture elements configured to capture the pin heads of the mechanical coupling pins of the first mechanical coupling unit of a second such battery casing; the battery casing including a first electrical connector unit associated with the first mechanical coupling unit, and a second electrical connector unit associated with the second mechanical coupling unit, the second electrical connector unit being configured to cooperate with the first electrical connector unit of a second such battery casing to form an electrical connection therebetween upon cooperation of the second mechanical coupling unit with the first mechanical coupling unit of a second such battery casing; the first electrical connector unit including a first locking element and the second electrical connector unit including a second locking element; and the second locking element being configured to mechanically cooperate with the first locking element of a second such battery casing to lock the battery to a second such battery casing.

* * * * *